Figure 1:
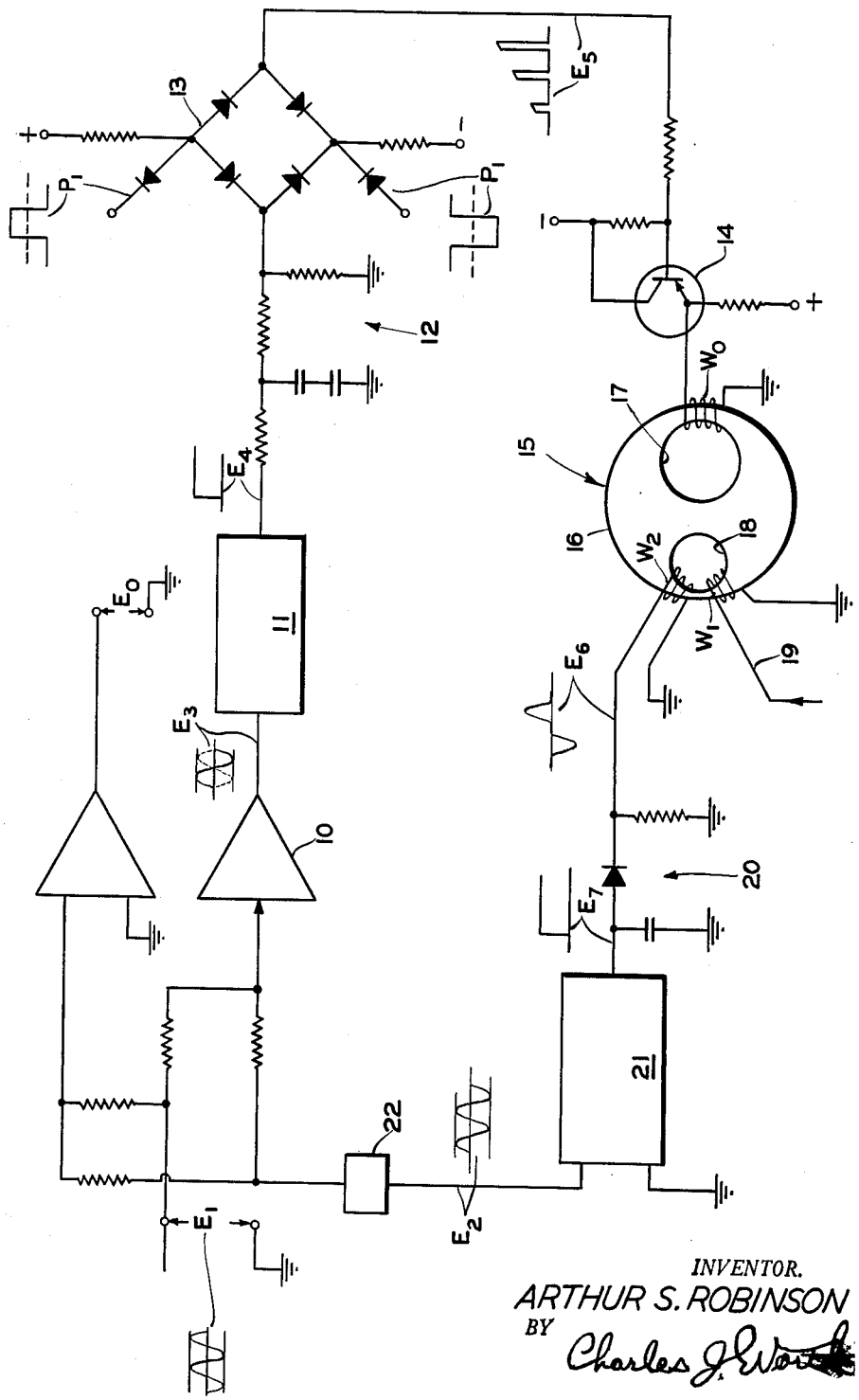

Dec. 21, 1965   A. S. ROBINSON   3,225,210
TRANSFLUXOR SYNCHRONIZER FOR FLIGHT CONTROL SYSTEMS
Filed Feb. 12, 1960   2 Sheets-Sheet 1

INVENTOR.
ARTHUR S. ROBINSON
BY Charles J. Wort
AGENT

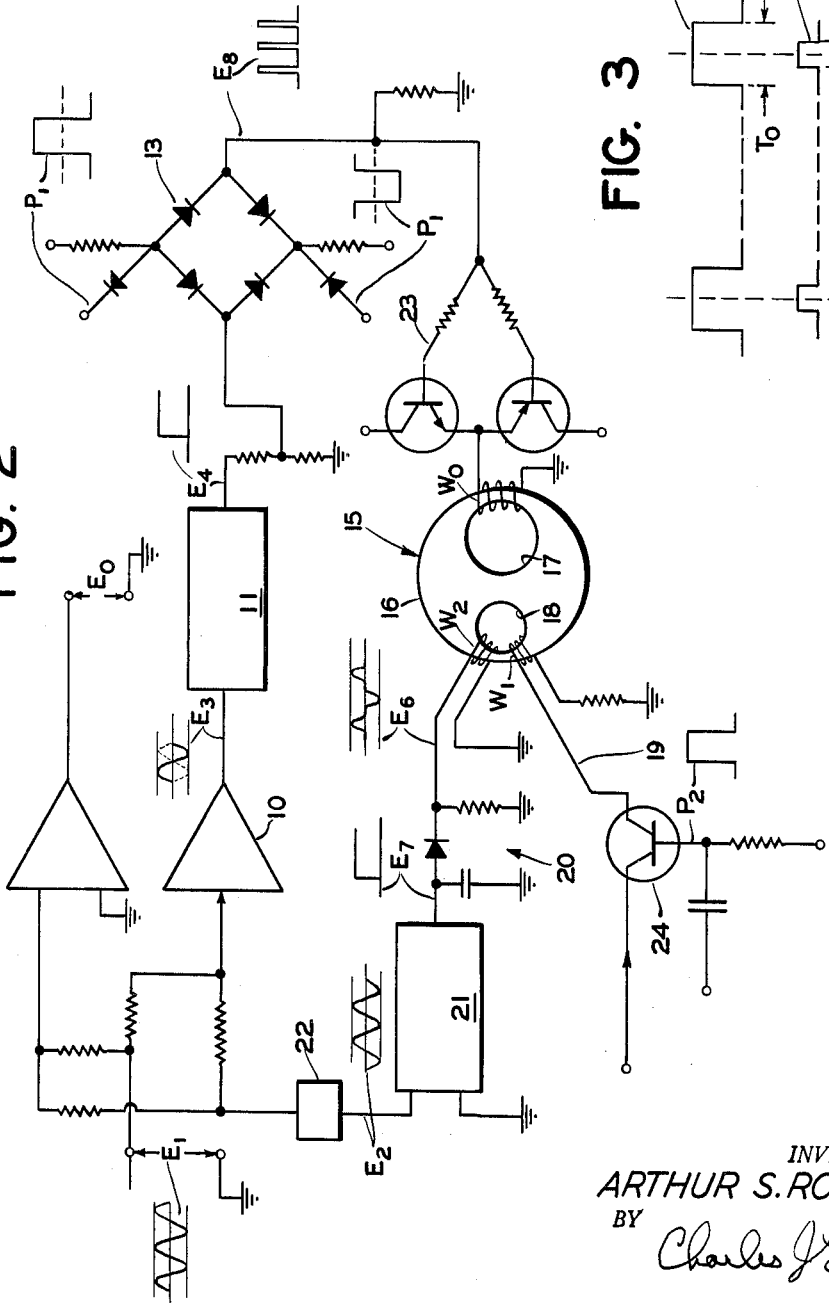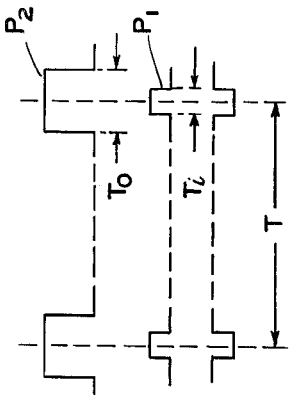

United States Patent Office

3,225,210
Patented Dec. 21, 1965

3,225,210
TRANSFLUXOR SYNCHRONIZER FOR FLIGHT
CONTROL SYSTEMS
Arthur S. Robinson, Allendale, N.J., assignor to The
Bendix Corporation, a corporation of Delaware
Filed Feb. 12, 1960, Ser. No. 8,317
13 Claims. (Cl. 307—88)

This invention relates to automatic flight control systems for aircraft and more specifically to synchronizers for providing signals to maintain the system at null when the craft is flown manually, and to prevent transients when the craft is returned to automatic control.

Heretofore, electromechanical servo systems were used for this purpose, but these systems were slow to respond and added considerable weight to the aircraft. A typical synchronizer using electromechanical components is shown and described in U.S. Patent No. 2,589,834, issued March 18, 1952. Electrical systems were also tried, but were of limited value because of short memory characteristics.

An object of this invention is to provide a synchronizer for an aircraft control system having no moving parts and which is relatively light in weight, compact in structure and rugged.

Another object of this invention is to provide an electronic synchronizer having infinite memory and nondestructive readout characteristics.

This invention contemplates a synchronizer which is adapted to receive command signals and has means for providing control pulses for a transfluxor which is included as a memory device for producing signals to oppose the command signals.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

FIGURE 1 is a schematic view of a novel synchronizer constructed according to the invention, FIGURE 2 is a schematic view of a modification of the synchronizer of FIGURE 1, and, FIGURE 3 illustrates the relation of the various pulses to each other.

Referring now to FIGURE 1, alternating voltage command signals $E_1$, are presented to the input of the synchronizer. The synchronizer generates alternating voltage feedback signals $E_2$ which are provided at its output to oppose the command signals $E_1$ such that resulting modified command signals $E_0$ approach a null. The synchronizer comprises an input line to receive signals $E_1$ and $E_2$ that are presented to an error amplifier 10 having an alternating voltage output $E_3$ which represents the amplified difference between the signals $E_1$ and $E_2$. The amplified error signals $E_3$ are presented to a phase sensitive demodulator 11 which provides a direct voltage output $E_4$ of an amplitude and polarity that is established by the signals $E_3$. The direct voltage output $E_4$ passes through an R.C. filter 12, which provides a lag, and is presented to an electronic gate 13 that is controlled by keying pulses $P_1$. The electronic gate 13 provides pulse signals $E_5$ in response to pulses $P_1$ and which vary in amplitude as defined by the output of the R.C. filter 12. The varying amplitude pulses $E_5$ are presented to a current drive circuit 14 which provides a high impedance source for driving current pulses to a control winding $W_0$ of a transfluxor 15. The transfluxor 15 has a magnetic core 16 with two openings 17 and 18 therein. The control winding $W_0$ is associated with and controls the magnetization around the opening 17 in the core 16. The current pulses which are received by the control winding $W_0$ incrementally varies the polarity and density of this magnetization or control flux according to the polarity and the increase in amplitude of the pulses.

An alternating current excitation is presented to the transfluxor 15 by a circuit 19, including the primary winding $W_1$ of the transfluxor 15, to create an alternating secondary flux around the opening 18 in the transfluxor core 16. A secondary winding $W_2$ is associated with the opening 18 and is excited by the secondary flux. The induction from the primary winding $W_1$ to the secondary winding $W_2$ is controlled by the control flux induced in the transfluxor core 16 by the pulse signals that are received by the control winding $W_0$. The resulting distorted alternating voltage signals $E_6$ from the winding $W_2$ are peak detected by a circuit 20. The direct voltage output $E_7$ of the detector circuit 20 is presented to a modulator 21. The alternating voltages $E_2$ from the modulator 21 are fed back by the synchronizer output line to the error amplifier 10 and to the command signal transmission line between the terminals presenting signals $E_1$ and providing signals $E_0$. An electronic switch 22 may be provided in the output line to disconnect the synchronizer feedback during automatic flight control operation. This switch 22 together with the termination of pulses $P_1$ to the gate 13 completely disconnect the synchronizer and prevents the magnetization level of transfluxor 15 from being varied.

A modified synchronizer constructed according to the invention is shown in FIGURE 2. In this embodiment, the R.C. filter 12 of FIGURE 1 is not required and a lag in voltage is provided by a voltage drive circuit 23 which replaces the current drive circuit 14 of the synchronizer of FIGURE 1. In this modified circuit, the demodulator 11 is connected to the electronic gate 13. The direct voltage output $E_4$ received by the gate is of an amplitude and polarity that is established by the signals $E_3$. The gate 13 provides pulse signals $E_8$ having an amplitude defined by the magnitude of the direct voltage $E_4$. Signals $E_8$ are received by low impedance voltage drive circuit 23 which applies voltage pulses to the control winding $W_0$.

In the synchronizer shown in FIGURE 1, the pulse signals $E_5$ vary in amplitude as defined by the output of the R.C. filter 12. To vary the magnetization of the transfluxor 15 in response to these pulses, there will be a lag until a current pulse is applied to the control winding $W_0$, by the current drive circuit 14, which is at least equal to or greater than the threshold magnetizing force. In the embodiment shown in FIGURE 2, each voltage pulse from the voltage drive circuit 23 induces a voltage pulse greater than the threshold magnetizing force which incrementally varies the flux level in the transfluxor core 16.

When the transfluxor 15 is used as a memory device in a synchronizer, it is desirable to maintain accurately the magnetization of the transfluxor core 16 after the termination of the pulse signal which has established this magnetization. Although synchronizer operation may be accomplished if the gate 13 were closed throughout synchronization, the magnetization would not be maintained perfectly when the gate 13 was opened. To obtain this desired stable characteristic, the gate 13 is included in the synchronizer to provide a pulse control in which the pulse width is small in comparison to the pulse interval. The pulse width and the pulse interval of the pulse signals $E_5$ or $E_8$ are controlled by keying pulses $P_1$ which are presented to the electronic gate 13. This will be more clearly understood by referring to FIGURE 3. It has been determined that when the keying pulses $P_1$, which have an existence $T_1$ of 3 $\mu$seconds, are applied to gate 13 at a pulse interval T of 8000 μseconds, the magnetization of the transfluxor core 16 remains constant when the pulse signals which have established this magnetization terminate. The foregoing time constants are merely illustrative and are not to be construed as defining the limits of the invention.

When the synchronizer generates feedback signals $E_2$ which are substantially equal and opposite to the command signals $E_1$, the transfluxor 15 will receive no further pulses capable of varying the magnetization of the core 16. As long as the alternating current signals from the circuit 19 remain constant, the alternating voltage $E_2$ will remain constant. This is true due to the memory or nondestructive readout of the transfluxor 15.

In some instances when the control winding $W_0$ and the primary winding $W_1$ are excited simultaneously, spurious overshoots will be introduced into the output signals $E_6$ of the transfluxor 15. To prevent this interaction, an electronic gate 24 may be included in the circuit 19. Gate-out pulses $P_2$ are applied to the gate 24 to interrupt the excitation of primary winding $W_1$ concurrently with the keying pulses $P_1$. Each gate-out pulse $P_2$ has an existence $T_0$ which is slightly longer than the existence $T_1$ of each keying pulse $P_1$, as shown in FIGURE 3.

Although but two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:
1. A synchronizer having an input adapted to receive command signals, means for providing pulses corresponding to the command signals, and a transfluxor having a control winding connected to the pulse means and energized by the pulses, said transfluxor having an output connected in opposition to the input.

2. A synchronizer according to claim 1 in which the pulse means provides pulses having a pulse width which is small in comparison to the pulse interval.

3. A synchronizer according to claim 1 in which a gate is connected to the transfluxor to disconnect its output concurrently with the pulses.

4. In a synchronizer having an input adapted to receive command signals, a transfluxor connected to the input and controlled according to the command signals, and said transfluxor producing signals and having an output connected to the input for applying the signals in opposition to the command signals.

5. A synchronizer having an input adapted to receive alternating voltage command signals, a transfluxor to be magnetized and energized to provide signals at its output in accordance with the magnetization, means connecting the output of the transfluxor to the input and providing alternating voltages corresponding to the transfluxor signals in opposition to the command signals, means for providing direct voltages corresponding to the instantaneous difference between the command signals and the alternating voltages, and means for sampling the direct voltages to provide pulses to vary the magnetization of the transfluxor.

6. A synchronizer according to claim 5 in which the pulse means provides pulses having a pulse width which is small in comparison to the pulse interval.

7. A synchronizer according to claim 5 in which the pulse means includes a voltage drive circuit for applying the pulses to the transfluxor so that the magnetization of the transfluxor varies incrementally in response to each of the pulses.

8. A synchronizer according to claim 7 in which a gate is connected to the transfluxor to interrupt the transfluxor signals concurrently with the pulses.

9. A synchronizer having an input adapted to receive alternating voltage command signals, a transfluxor to be magnetized and energized to provide signals at its output in accordance with the magnetization, means connecting the output of the transfluxor to the input and providing alternating voltages corresponding to the transfluxor signals in opposition to the command signals, means for providing lagging direct voltages corresponding to the instantaneous difference between the command signals and the alternating voltages, means for sampling the lagging voltages to provide pulses, and a current drive circuit connecting the pulse means to the transfluxor for varying the magnetization of the transfluxor in response to the pulses.

10. A synchronizer according to claim 9 in which the pulse means provides pulses having a pulse width which is small in comparison to the pulse interval.

11. A synchronizer as defined in claim 4 which has an output receiving the opposed signals.

12. A synchronizer as defined in claim 5 which has an output receiving the opposing alternating voltages and command signals and provides an output corresponding thereto.

13. A synchronizer as defined in claim 9 which has an output receiving the opposing alternating voltages and command signals and provides an output corresponding thereto.

References Cited by the Examiner
UNITED STATES PATENTS

| | | | |
|---|---|---|---|
| 2,803,812 | 8/1957 | Rajchman | 340—174 |
| 2,884,622 | 4/1959 | Rajchman | 340—174 |
| 2,911,629 | 11/1959 | Wetzstein | 340—174 |
| 2,990,540 | 6/1961 | Sublette | 340—174 |

IRVING L. SRAGOW, *Primary Examiner.*

EVERETT R. REYNOLDS, JOHN F. BURNS,
*Examiners.*